Nov. 10, 1959  C. S. MORRISON  2,911,978
POTATO DEVINER
Filed Feb. 14, 1957
Fig. 1
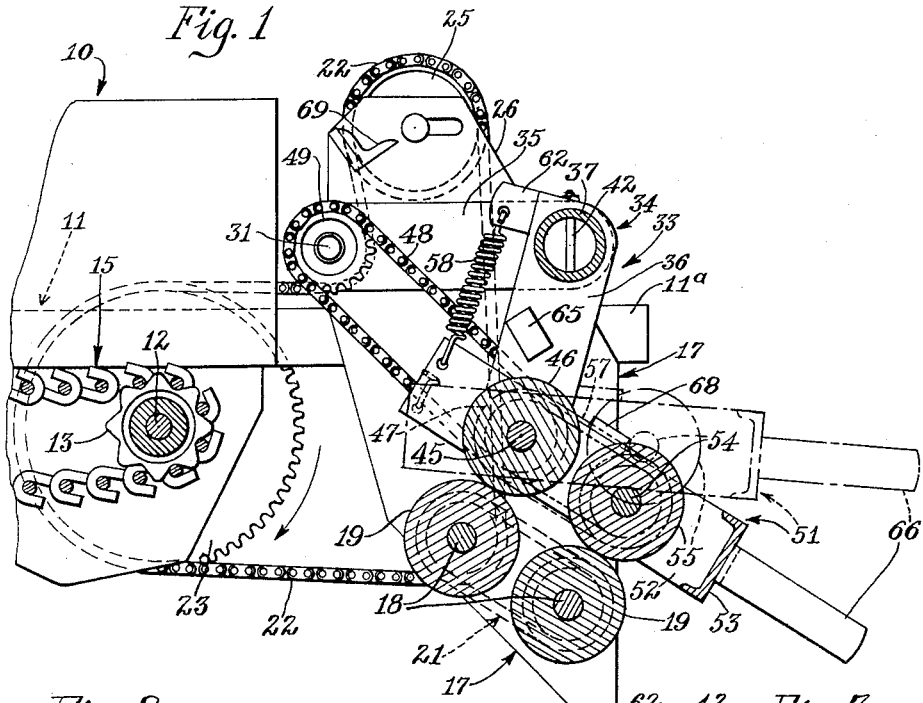
Fig. 2
Fig. 3
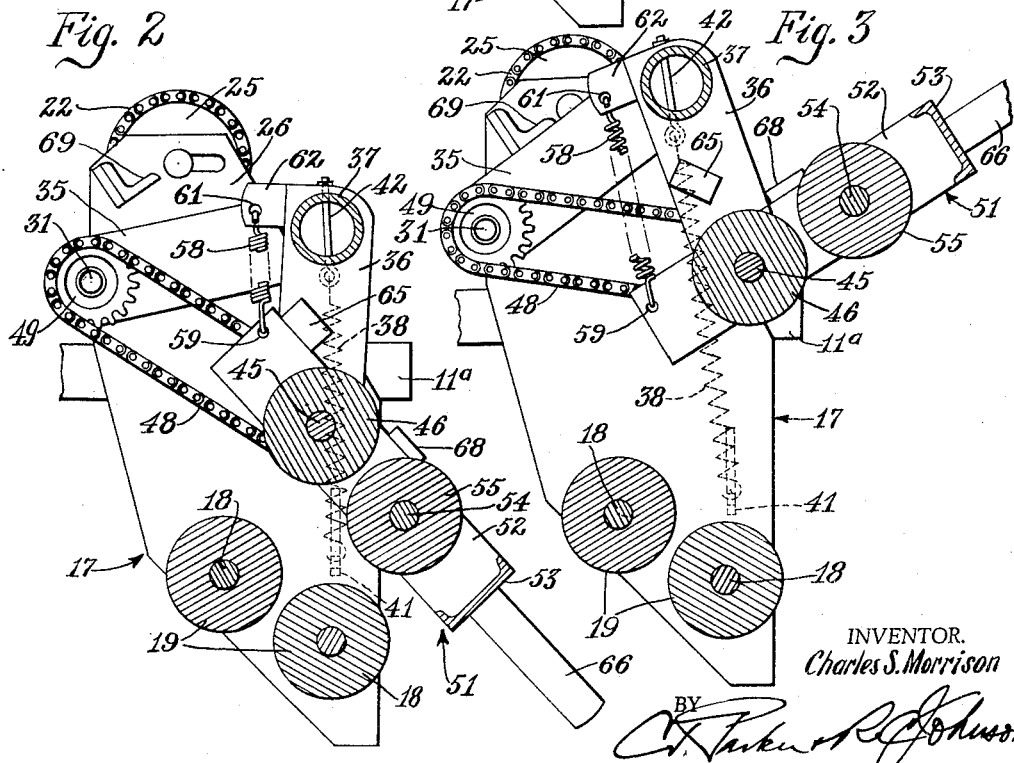
INVENTOR.
Charles S. Morrison
BY
Attorneys the time the material reaches the rear portion of the machine, as represented by the part of the machine shown in Fig. 1, most of the soil has been separated from the potatoes and only vines, trash and the like remain with the potatoes. The principal purpose of the mechanism of the present invention is to provide means for conveniently and easily separating the vines, trash and the like from the potatoes.

United States Patent Office

2,911,978
Patented Nov. 10, 1959

2,911,978
POTATO DEVINER

Charles S. Morrison, Moline, Ill., assignor, by mesne assignments, to Deere & Company, a corporation of Delaware Application February 14, 1957, Serial No. 640,237

3 Claims. (Cl. 130—30)

The present invention relates generally to agricultural machines and more particularly to machines for digging and/or harvesting potatoes and other root crops.

The object and general nature of the present invention resides in the provision of new and improved means for separating vines, trash and the like from the mass of potatoes and other material removed from the ground by the action of the potato digger or harvester. More specifically, it is a feature of this invention to provide a plurality of vine-engaging rollers so arranged that at least some of the rollers are held in frictional contact with the vines even though other rollers are held apart by the passage of relatively large masses of vines or other material through the rollers. Further, it is a feature of this invention to provide vine-engaging rollers for a potato digger or the like in which a plurality of pairs of rollers are provided, with means for independently urging the rollers into engagement, one with the other, whereby masses of vines or the like may pass through the rollers with substantially continuous contact between at least some of the rollers and the vines at all times.

Still further, a feature of this invention resides in the provision of a plurality of pairs of vine-engaging rolls so arranged that certain of the rolls may move, independently of other rolls, toward and away from the associated or coacting roll, yet beyond certain limits, all rolls may be permitted to separate so as to facilitate the passage between the rolls of excessively large masses of vines and other material.

These and other objects and advantages of the present invention will be apparent to those skilled in the art after a consideration of the following detailed description, taken in conjunction with the accompanying drawings, in which:

Fig. 1 is a side view, with certain parts being shown in section, of the rear portion of a potato digger or harvester, in which vine-separating means of the present invention have been incorporated.

Fig. 2 is a fragmentary view, similar to Fig. 1, showing both movable rolls separated from the associated rolls so as to accommodate the passage of relatively large masses of material through the rolls.

Fig. 3 is a view similar to Fig. 2 showing how the rolls may be widely separated, so as to provide for cleaning out packed jammed material from the rolls.

Referring first to Fig. 1, the reference numeral 10 indicates a potato digger or harvester that may, for example, be alike or similar to the potato digger shown in U.S. Patent 2,544,744, issued March 13, 1951 to Austin E. Young or the potato harvester shown in U.S. Patent 2,633,685, issued April 7, 1953 to Curtiss V. Edwards. As shown, the digger or harvester 10 includes frame means 11 carrying a shaft 12 on which sprockets 13 are supported. The sprockets 13 support the rear portion of a potato chain 15 by which the potatoes, vines, trash and the like dug or separated from the soil by the usual potato digger shovel or the like, are carried toward the rear of the machine. Generally speaking, by According to the principles of the present invention, the rear portion 11a of the potato or harvester frame 11 carries support means in the form of a pair of brackets 17, there being one at each side of the machine. These brackets carry suitable bearing means (not shown) in which shafts 18, carrying rolls 19, are journaled. These rolls 19 are arranged in parallel relation, and these rolls are caused to rotate in the same direction by means that includes a sprocket chain 21 that is indicated more or less diagrammatically in Fig. 1. Preferably, although not necessarily, the forwardmost roll 19 is driven by means that includes a sprocket chain 22 that is trained over a sprocket 23 carried by one end of the shaft 12 of the potato digger or harvester, the chain 22 being trained over a sprocket (not shown) on the forwardmost shaft 18 and also over a sprocket 25 that is carried by the upper portion 26 of the bracket structure 17.

At each said of the machine each bracket structure 17 includes or carries a stub shaft 31 and these stub shafts, only one of which is shown in the drawings, serve as pivot means rockably connecting an articulated frame structure 33 with the supporting structure 17. The frame structure 33 comprises a first frame 34 that is made up of a pair of rigidly interconnected bars 35 and 36 and a transverse pipe member 37 that rigidly interconnects the bars 35 and 36 at one side of the machine with the companion bars at the other side of the machine. Preferably, but not necessarily, the bars 35 and 36 at each side of the machine are secured by welding to one another and to the associated pipe member 37. The first frame 34 just described, is free to swing vertically about the axis defined by the stub shafts 31 but is yieldingly urged generally downwardly by a pair of springs, one of which is indicated at 38 in Figs. 2 and 3. While only one spring is shown, it will be understood that there is a spring 38 at each side of the machine, each spring being connected at its lower end to a bracket 41 fixed to the associated supporting structure 17, and the upper end of each spring 33 is connected by an eye bolt 42 with a laterally outwardly disposed extension, there being a bolt-receiving extension at each end of the pipe 37.

The outer or lower end of each of the bars 36 is apertured to receive a roll shaft 45 upon which a vine-engaging roll 46 is carried. The roll 46 is thus rotatably carried by the frame 34 and is driven by a sprocket 47 fixed to one end of the shaft 45 and receiving a driving chain 48 that at its upper portion is trained over a double sprocket 49 that is journaled for rotation on the right hand stub shaft 31 as shown in Fig. 1. The other portion of the compound sprocket 49 receives a portion of the driving chain 22 so that whenever the elevator 15 is operated, the lower rolls and the upper roll 46 are rotated, the parts being arranged so that the rolls are rotated at substantially the same speed.

The articulated framework 33 mentioned above includes, in addition to the frame 34, a second frame 51 that includes end members 52 and a cross channel 53, these parts being rigidly interconnected, as by welding or the like. The end members 52 are pivotally mounted on the roll shaft 45, which carries the upper roll 46, and adjacent the shaft 45, the frame 51 includes a second shaft 54 on which a vine-engaging roll 55 is carried. The latter and the shaft 54 are rotated with the roll 46 by means of a sprocket chain 57 shown diagrammatically in Fig. 1, The frame 51, carrying the roll 55, is free to swing relative to the associated frame 34 but is yieldingly urged in a generally downward direction relative thereto by a pair of springs 58, only one of which is shown in the drawings. Each spring 58 is connected, as at 59, to the inner end of the associated frame bar 52, and at its upper end each spring 58 is connected, as at 61, to a lug 62 that is carried by the frame 34. From Fig. 1 it will be seen that the rolls 46 and 55 are so located that when the articulated frame structure 33 is swung downwardly, the rolls 46 and 55 engage the rolls 18 and 19, respectively, being urged into yielding contact therewith by virtue of the springs 38 and 58.

In operation, whenever the potato digger or harvester chain 15 is actuated, the chain 22 and other associated driving means rotates all of the vine-engaging rollers 18, 19, 46 and 55. As viewed in Fig. 1, the sprocket 23 is rotated in a clockwise direction and the several rolls are also rotated. The lower rolls 19 are rotated in a clockwise direction while the upper rolls 46 and 55 are rotated in a counterclockwise direction. Thus, as the mass of potatoes, vines, trash and the like move rearwardly over the chain 15 and then drop downwardly between the latter and the vine-engaging rolls, the rotation of the latter serves to cause them to grasp the vines, trash and the like. The peripheral speed of the rolls 19, 46 and 55 is appreciably greater than the rate of movement of the conveyor chain 15, and hence as soon as the rolls 19 and 46 effectively engage the vines, the latter are pulled in between the rolls with a suddenly accelerated movement. This serves to jerk the vines away from the potatoes so that the latter fall downwardly into a conveyor (not shown) or other suitable means to receive the potatoes or other crop. Ordinarily, both sets of rolls, as shown in Fig. 1, are yieldingly held in a position to grasp vines as they pass between the rolls. However, each of the upper rolls 46 and 55 is free to move away from the associated lower roll, independently of the other roll. That is, if for example, a lump of matted vines, trash or the like starts to pass between the forwardmost roll 19 and the cooperating roll 46, the frame 34 is free to pivot about the axis 31, 31, but since the springs 58 urge the frame 51 downwardly, the rear roll 55 is momentarily held in engagement with the roll 19 or with vines lying therebetween. Then, as the mass of material passes on to the rear rolls 19, 55, the frame 51 is free to swing upwardly, as to the dotted line position shown in Fig. 1, so that the mass passes on and out of the rolls while as soon as the mass passes beyond the front rolls 19, 46, the frame 34 is free to swing back to its original position in which the roll 46 is in operative engagement with the associated lower roll 19 so as to engage and draw oncoming vines and trash away from the potatoes. Thus, according to the principles of the present invention, where a plurality of upper and lower rolls are provided, with the upper rolls arranged for independent movement toward and away from the lower rolls, lumps or masses of material may pass through the vine-engaging means, first separating one pair of rolls, and then the next pair, while the first pair returns to their normal operative engaging position. In this way, generally speaking, there always is one pair of rolls in a position to engage and grasp vines lying between them.

The movement of the frame 51 relative to the frame 34 is limited by stop means in the form of a pair of abutments 65. Only one of these abutments is shown in the drawings, but it will be understood that there is an abutment or stop 65 at each side of the machine. As best shown in Fig. 2, the abutments 65 limit the clockwise movement of the outer frame 51 relative to the companion frame 34, and as illustrated in Fig. 2, if an excessively large lump or mass of material is drawn in between the forward rolls 19, 46, the resulting upward swinging of the frame 34 serves also to lift the frame 51, carrying with it the roll 55 so that the latter is lifted momentarily away from the associated lower roll 19. This disposes the upper roll 55 in a position that facilitates the movement of the roll 55 up onto and over the excessively large mass of material, thus facilitating the passage of the latter between the upper and lower rolls. It will be understood that normally one or the other or both of the upper rolls 46 and 55 will be held by the associated springs in a position that presses vines and the like downwardly and into contact with the associated rolls 19.

If for any reason it should be necessary to clean out matted vines and other jammed material, it is a simple matter to manually raise both frames 34 and 51 into an upper position, as shown in Fig. 3. To facilitate this, I provide a handle 66 on the lower or outer frame 51 whereby the latter may be lifted, and to insure that the other frame 34 will also be lifted, I provide a stop 68 on the frame 51, disposing the same in a position to engage the frame 34, as shown in Fig. 3, so that a continued lifting effort exerted on the handle 66 will raise both frames 34 and 51 upwardly to a position where the upper rolls are widely separated from the lower rolls, thus facilitating clearing out any jammed or massed vines or the like. A stop 69 on each bracket portion 26 serves to limit the upward movement of the frame 33.

While I have shown and described above the preferred structure in which the principles of the present invention have been incorporated, it will be understood that my invention is not to be limited to the particular details, shown and described above, but that, in fact, widely different means may be employed in the practice of the broader aspects of my invention.

What I claim, therefore, and desire to secure by Letters Patent is:

1. In a potato harvester, devining mechanism adapted to be disposed at the discharge end of a potato conveyor carrying a mass of potatoes, vines and the like, said devining mechanism comprising a support means, a pair of generally parallel rollers journaled on said support means, a second pair of rollers disposed adjacent and adapted to contact, respectively, the rollers of said first pair, a first frame carrying one roller of said second pair of rollers, and pivotally connected with said support for generally swinging movement toward and away from said first pair of rollers, a second frame carrying the other roller of said second pair and pivotally connected with said first frame so as to swing relative to the first frame and carry said other roller of the second pair of rollers toward and away from the adjacent roller of said first pair, resilient means connected between said frames and acting to urge said other roller of the second pair of rollers toward said adjacent roller, and resilient means connected between said support means and said first frame so as to urge both rollers of the second pair toward the rollers of said first pair.

2. In a potato harvester, devining mechanism adapted to be disposed at the discharge end of a potato conveyor carrying a mass of potatoes, vines and the like, said devining mechanism comprising a support means, a pair of generally parallel rollers journaled on said support means, a second pair of rollers disposed adjacent and adapted to contact, respectively, the rollers of said first pair, a first frame movably connected with said support and carrying one roller of said second pair of rollers, a second frame carrying the other roller of said second pair and mounted for movement relative to said first frame, whereby the rollers of said second pair are movable independently of one another toward and away from the rollers of said first pair, and stop means limiting the relative movement between said frames, whereby when the roller on said first frame moves more than a predetermined distance away from the associated roller of said first pair of rollers, the roller on said second frame is also moved away from the roller associated therewith on said support means.

3. In a potato harvester, a support means, a pair of rollers carried thereby in generally parallel relation, a second pair of rollers adapted, respectively, to engage the rollers of said first pair, a pair of articulated frames carrying said second rollers, respectively, and swingably connected with the support means carrying said first pair of rollers, whereby the rollers of the second pair are movable toward and away from the first pair of rollers independently of one another, spring means acting between said articulated frames for urging one frame of said pair of frames to swing relative to the other frame of said pair, stop means carried by one of said articulated frames and engageable with the other frame to limit said relative movement, means acting against said other of said pair of frames to swing both of side frames and the rollers carried thereby toward said first pair of rollers, and handle means carried by said other of said articulated frames and acting through said stop means for moving both of the rollers of said second pair away from said first-mentioned rollers.

References Cited in the file of this patent

UNITED STATES PATENTS

| | | |
|---|---|---|
| 922,915 | Kniffen | May 25, 1909 |
| 1,358,302 | Ellis | Nov. 9, 1920 |
| 2,463,918 | Stewart | Mar. 8, 1949 |
| 2,775,991 | Elliott | Jan. 1, 1957 |